United States Patent [19]
Wallace

[11] 3,757,673
[45] Sept. 11, 1973

[54] APPARATUS FOR COOKING OR HEATING FOODSTUFFS

[76] Inventor: Griffith Wallace, 22 Daphne St., Botany, New South Wales, Australia

[22] Filed: June 22, 1971

[21] Appl. No.: 155,527

[30] Foreign Application Priority Data
July 10, 1970   Australia.............................. 1795/70

[52] U.S. Cl. ..................................... 99/410, 99/448
[51] Int. Cl. ........................................... A47j 37/12
[58] Field of Search...................... 99/448, 259, 291, 99/298, 336, 339, 367, 374, 403, 407, 410, 411, 416–417, 426

[56] References Cited
UNITED STATES PATENTS

| | | | |
|---|---|---|---|
| 516,557 | 3/1894 | Stone .............................. | 99/426 UX |
| 1,255,014 | 1/1918 | Janiszewski............................ | 99/410 |
| 1,316,827 | 9/1919 | Brunner................................ | 99/414 |
| 1,335,306 | 3/1920 | Urso ..................................... | 99/414 |
| 1,931,120 | 10/1933 | Shroyer............................. | 99/408 X |
| 2,323,623 | 7/1943 | Porter et al........................... | 99/403 |
| 2,645,993 | 7/1953 | Voss ..................................... | 99/259 |

*Primary Examiner*—John Petrakes
*Assistant Examiner*—Arthur O. Henderson
*Attorney*—Emory L. Groff

[57] ABSTRACT

A cooking or heating apparatus having means whereby bags of foodstuffs can be selectively suspended therein and removed therefrom.

1 Claim, 3 Drawing Figures

Patented Sept. 11, 1973

INVENTOR
GRIFFITH WALLACE
BY Emory L. Groff
Atty

APPARATUS FOR COOKING OR HEATING FOODSTUFFS

This invention relates to apparatus for cooking or heating foodstuffs. While not limited thereto the apparatus is particularly applicable to the heating of foodstuffs prepared as a composite meal and held in a plastic bag until required. As so applied, it has substantial advantages over known cooking or heating devices where various forms of composite foodstuffs are prepared and have to be served at short notice as in restaurants and the like.

Hitherto foodstuffs so prepared have of necessity been substantially indiscriminately deposited in cooking or heating devices and selective withdrawal of the heated foodstuffs has not been an easy task.

With the apparatus of the present invention the bags of foodstuff can be easily deposited and selectively withdrawn from the apparatus, the bags being in the apparatus for the longest periods can be easily identified by their position therein.

According to this invention a cooking or heating apparatus is provided with a rod or an array of rods each having means by which bags of foodstuffs can be suspended therefrom. The rod or rods is or are supported in a manner whereby it or they can be moved to give access to the bag suspension means and to place bags suspended therefrom in the cooking or heating zone and to remove the bags from such zone.

Two embodiments of the invention are described with reference to the annexed drawings wherein.

Figure 1:
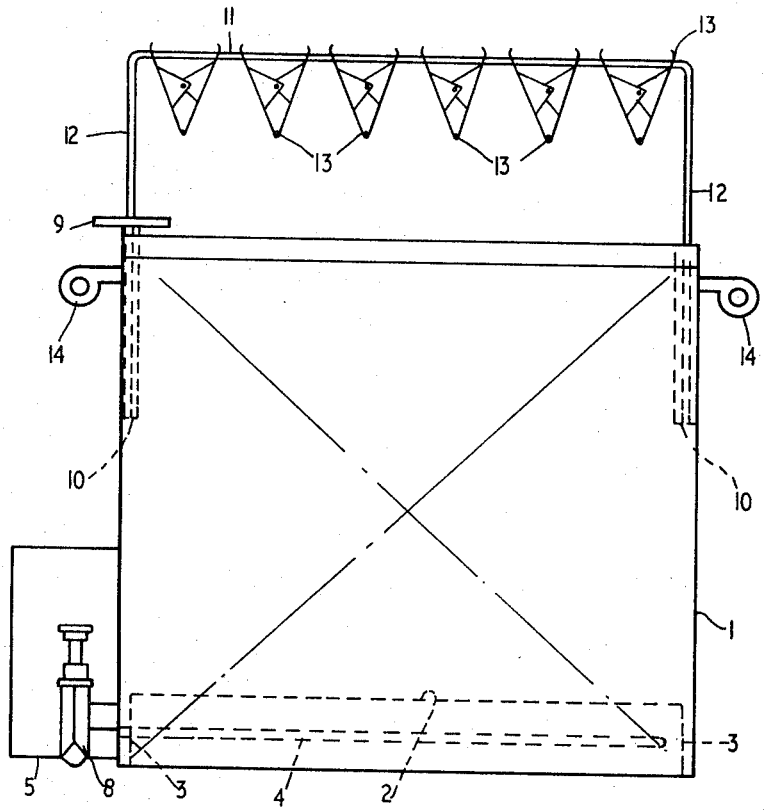
FIG. 1 is an end elevation of one form of the apparatus having one rod for foodstuff support means.
Figure 2:
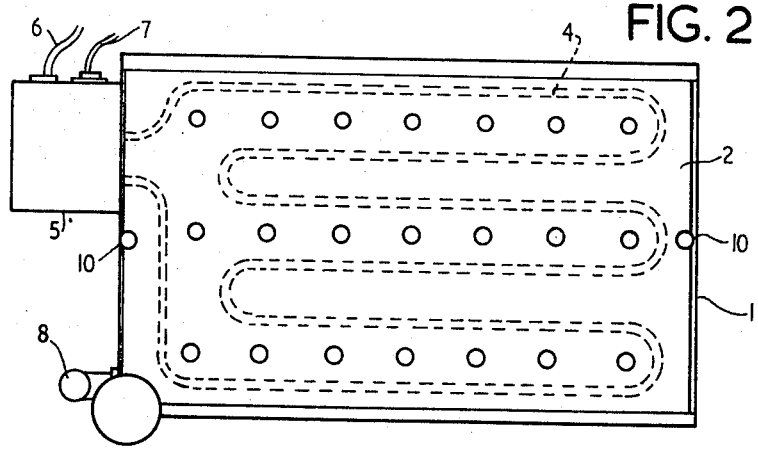
FIG. 2 is a plan of the apparatus shown in FIG. 1 omitting the support means for bags of foodstuff.

Referring to FIGS. 1 and 2 the apparatus comprises an open top rectangular tank 1 having a perforated tray 2 supported above the bottom by flanges constituting legs 3. The heating means is water in the tank which is heated by an electric element 4 connected in a control box 5 by lead 6 to a power supply controlled by a switch indicated at 7. There is a water outlet from the tank 1 which is controlled by tap 8. Preferably the tank incorporates a temperature indicator, indicated at 9 and the indicator may include a temperature controller.

At each end of the tank there is a tubular socket 10 and a U shaped rod having a straight web 11 and straight legs 12 is mounted on top of the tank by inserting the legs 12 in the sockets 10. The web 11 has a plurality of bag holding spring clips 13 thereon. At each end of the tank there is a handle 14. The parts are so arranged that bags of foodstuff secured by the spring clips 13 are individually suspended in the tank 1 and raised out of the tank by raising the rod or releasing the bag or bags from the spring clips.

Racks (not shown) may be arranged to support the rods externally of the tank to facilitate securing bags of foodstuff thereto and removing them.

Figure 3:
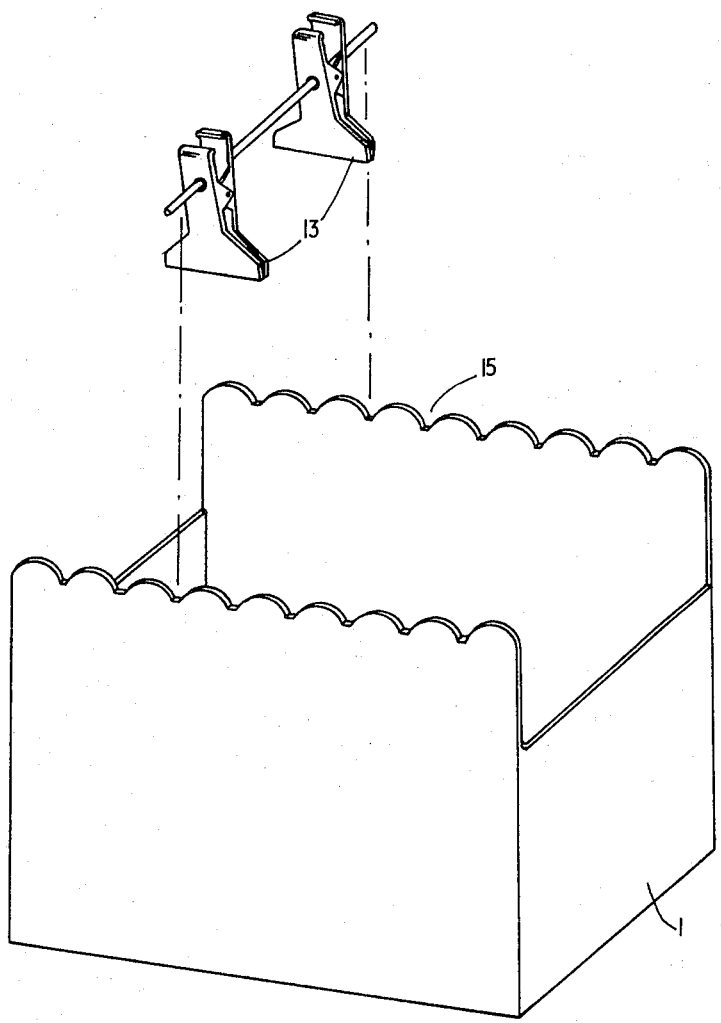
FIG. 3 is an outline perspective view of another form of the apparatus having provision to accommodate a plurality of rods for foodstuff support means (one only being shown).

In FIG. 3 the construction described with reference to FIGS. 1 and 2 is varied by forming serrations 15 on the tops of the longitudinal walls of the tank 1. The serrations are so spaced that straight rods placed in the webs of the serrations are supported in parallel spaced relationship. A plurality of bag holding spring clips 13 are mounted on the rods. In all other respects the apparatus is the same as that described with reference to FIGS. 1 and 2 and it functions in the same manner.

I claim:

1. An improvement in apparatus for heating foodstuffs enclosed in a container, said apparatus comprising an open top container for holding a supply of water, electric heating means in the bottom of said container and extending throughout substantially the entire area of the bottom of said container, a perforated tray supported in the bottom of the container above said heating means, tubular sockets on the upper portions of opposite walls of said container, at least one U-shaped rod removably supported in said sockets, a plurality of spring clip members attached to said rod, said clip members adapted to support said containers during the heating of the foodstuffs enclosed therein.

* * * * *